US011359560B2

(12) United States Patent
Waszak et al.

(10) Patent No.: US 11,359,560 B2
(45) Date of Patent: Jun. 14, 2022

(54) METHOD FOR MEASURING THE PRESSURE OF A COMPRESSED GASEOUS FUEL IN A SUPPLY LINE OF AN ENGINE EQUIPPING A MOTOR VEHICLE AND ASSOCIATED MEASURING DEVICE

(71) Applicants: Continental Automotive France, Toulouse (FR); Continental Automotive GmbH, Hannover (DE)

(72) Inventors: Wladia Waszak, Saint Just (FR); Hervé Richard, Toulouse (FR); Franck D'Araujo, Escalquens (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 13 days.

(21) Appl. No.: 16/310,139

(22) PCT Filed: Jun. 13, 2017

(86) PCT No.: PCT/FR2017/051512
§ 371 (c)(1),
(2) Date: Dec. 14, 2018

(87) PCT Pub. No.: WO2017/216467
PCT Pub. Date: Dec. 21, 2017

(65) Prior Publication Data
US 2019/0178175 A1    Jun. 13, 2019

(30) Foreign Application Priority Data
Jun. 17, 2016  (FR) ........................... 1655640

(51) Int. Cl.
*F02D 41/00* (2006.01)
*F02D 19/02* (2006.01)
(Continued)

(52) U.S. Cl.
CPC ....... *F02D 41/0027* (2013.01); *F02D 19/027* (2013.01); *F02D 19/029* (2013.01);
(Continued)

(58) Field of Classification Search
CPC .. F02D 41/0027; F02D 19/027; F02D 19/029; F02D 2200/0604;
(Continued)

(56) References Cited

U.S. PATENT DOCUMENTS 5,491,341 A * 2/1996 McCaul ............... G01N 21/274
250/341.5
5,847,393 A * 12/1998 Van Den Berg ........ A61L 2/208
250/339.13
(Continued)

FOREIGN PATENT DOCUMENTS

CN    102323235 A    1/2012
EP    2876430 A1    5/2015
(Continued)

OTHER PUBLICATIONS

International Search Report and Written Opinion for International Application No. PCT/FR2017/051512, dated Sep. 5, 2017—8 pages.
(Continued)

*Primary Examiner* — David Hamaoui
(74) *Attorney, Agent, or Firm* — RatnerPrestia

(57) ABSTRACT

A method for measuring pressure of a gaseous fuel compressed in a feed system of an engine equipping a motor vehicle, by a pressure measuring device having an infrared quality sensor and an electronic control unit, the measuring method being characterized in that it consists in determining a corrected absorbance value of the fuel based on absorbance measurements performed by infrared analysis, at preset wavelengths, and in comparing the value to a nominal absorbance value, determined beforehand based on absor- (Continued)

bance measurements performed at a nominal pressure after a pressure stabilization phase of the fuel and at the same said wavelengths, in order to determine the fuel pressure.

18 Claims, 5 Drawing Sheets

(51) Int. Cl.
*F02M 21/02* (2006.01)
*G01L 11/02* (2006.01)
*G01M 15/09* (2006.01)

(52) U.S. Cl.
CPC ......... *F02M 21/0215* (2013.01); *G01L 11/02* (2013.01); *G01M 15/09* (2013.01); *F02D 2200/0604* (2013.01); *F02D 2200/0611* (2013.01); *Y02T 10/30* (2013.01)

(58) Field of Classification Search
CPC ........ F02D 2200/0611; F02M 21/0215; G01L 11/02; G01M 15/09; Y02T 10/32
See application file for complete search history.

(56) References Cited

U.S. PATENT DOCUMENTS

| | | | |
|---|---|---|---|
| 7,183,552 B2* | 2/2007 | Russell | A61B 5/083 |
| | | | 250/338.5 |
| 7,427,501 B2* | 9/2008 | Bachur, Jr. | C12M 41/34 |
| | | | 250/328 |
| 8,189,196 B2* | 5/2012 | Belz | C07D 209/94 |
| | | | 356/420 |
| 9,857,345 B2* | 1/2018 | Toivonen | F23N 5/022 |
| 9,932,910 B2* | 4/2018 | Hunter | F02M 21/0218 |
| 10,094,765 B2* | 10/2018 | Waszak | G01N 21/255 |
| 2002/0029770 A1 | 3/2002 | Heffel et al. | |
| 2003/0074957 A1 | 4/2003 | Lemecha et al. | |
| 2004/0256560 A1 | 12/2004 | Russell | |
| 2007/0165230 A1* | 7/2007 | Berg | G01L 11/02 |
| | | | 356/436 |
| 2015/0300272 A1 | 10/2015 | Pluta | |
| 2015/0300273 A1 | 10/2015 | Hunter | |
| 2016/0146142 A1 | 5/2016 | Harper | |

FOREIGN PATENT DOCUMENTS

EP 2933464 A1 10/2015
WO 2004081612 A2 9/2004

OTHER PUBLICATIONS

Chinese Office Action for Chinese Application No. 201780050185.9, dated Apr. 2, 2021, with translation, 15 pages.
Korean Notice of Allowance for Korean Application No. 10-2019-7001549, dated Sep. 23, 2021, with translation, 3 pages.

* cited by examiner

METHOD FOR MEASURING THE PRESSURE OF A COMPRESSED GASEOUS FUEL IN A SUPPLY LINE OF AN ENGINE EQUIPPING A MOTOR VEHICLE AND ASSOCIATED MEASURING DEVICE

CROSS REFERENCE TO RELATED APPLICATIONS

This application is the U.S. National Phase Application of PCT International Application No. PCT/FR2017/051512, filed Jun. 13, 2017, which claims priority to French Patent Application No. 1655640, filed Jun. 17, 2016, the contents of such applications being incorporated by reference herein.

FIELD OF THE INVENTION

The invention relates to a method for measuring the pressure of a compressed gaseous fuel in a supply line of an engine of a motor vehicle and an associated measuring device. More particularly, the invention relates to an infrared optical sensor incorporating a spectrometric measurement cell for real-time gas analysis, this sensor being particularly useful for the continuous analysis of a gas circulating in a fuel line.

As a primary, although non-exclusive, application, the invention relates to the monitoring of the quality and the composition of the fuels of vehicles by sensors on board these vehicles. This monitoring has become essential with the increasing use of natural gases of various origins and compositions.

If this control is performed in real time, it allows the vehicle control system to adapt various engine tuning parameters in order to improve combustion efficiency, such as the amount of fuel injected, ignition advance, intake pressure or even the pollution control settings.

BACKGROUND OF THE INVENTION

Fuel composition can be monitored at the pump; the quality must remain constant, with a wide choice of fuels of petroleum origin or gas having variable percentages of methane, carbon dioxide or nitrogen. A simple means of knowing this composition is through the use of sensors placed in the tank or between the tank and the engine so that the electronic management system of the vehicle can adapt the engine tuning parameters. The field of infrared light is currently recognized as relevant for the optical spectroscopic analysis of the characteristics of gaseous fuels, such as methane, butane, propane, ethane carbon dioxide content or calorific value.

When using fuels such as compressed natural gas, it is also necessary to know the pressure of the gas in the engine intake duct.

The compressed natural gas is generally available at a high pressure, above 200 bar, and at around 250 bar. It is at this pressure that the tank in the motor vehicle is filled.

The gas, compressed to 250 bar in the tank of the vehicle, is filtered and then reduced to a pressure of less than 20 bar, generally 8 bar, in order to supply the engine.

For this purpose, a regulator, calibrated at a desired supply pressure, is placed in the supply line between the tank and the engine. In order to control the supply pressure, a pressure sensor is also located downstream from the regulator. Controlling the pressure allows the injection parameters to be adjusted and particularly to detect any failure of the natural gas feed system, overpressure or leakage.

This is represented in FIG. 1. FIG. 1 represents a compressed gas feed system S, on board a motor vehicle.

The feed system S comprises a natural gas tank 10 compressed to a pressure of approximately 250 bar, in the form of two cylinders, each equipped with a valve 20. Opening the valves 20 allows the compressed gas to circulate toward a filter 30; and then toward a pressure regulator 40, more precisely a pressure-control valve, which expands the compressed gas from an initial pressure of 250 bar to an inlet pressure of less than 20 bar, generally around 8 bar. The expanded compressed gas is then analyzed by a quality sensor 50. A pressure measuring sensor 80 is located between the pressure regulator 40 and the quality sensor 50. The quality sensor 50 is of the spectrometer type, i.e. infrared analysis.

The fuel, the pressure and composition of which were thus determined, is then injected into the engine M via at least one injector 60 connected to an injection ramp 80.

The operation of the valves 20, the pressure sensor 80, the quality sensor 50 and the injector 60 is controlled by an ECU type on-board electronic control unit 70. The electronic control unit 70 manages the actuation of the valves 20 and of the injector 60, and receives the pressure and fuel analysis information from the pressure measurement sensor 80 and the quality sensor 50.

The electronic control unit 70 also supplies all these components with electrical power.

This pressure sensor represents a non-negligible cost in the feed system S. It is also an additional potential source of failure.

SUMMARY OF THE INVENTION

An aspect of the present invention proposes a fuel infrared analysis and pressure measurement device that does not require an additional pressure sensor.

An aspect of the invention relates to a method for measuring the pressure of a compressed gaseous fuel in a feed system of an engine equipping a motor vehicle, using a pressure measuring device comprising an infrared quality sensor and an electronic control unit, the measurement method being characterized in that it consists in determining a corrected absorbance value for the fuel based on absorbance measurements performed by infrared analysis at preset wavelengths, and comparing said value to a nominal absorbance value previously determined from absorbance measurements made at a nominal pressure after a phase of stabilization of the fuel pressure and at the same said wavelengths in order to determine the fuel pressure.

The method for measuring the pressure according to an aspect of the invention, in a first embodiment, comprises the following steps:

Step E3a: measurement and storage of a nominal absorbance determined based on absorbance measurements made at a first wavelength and at a second wavelength, preset and distinct from one another, at a nominal pressure, Step E5a: measurement of at least a first and a second absorbance value at the first wavelength and at the second wavelength, preset and distinct from one another, Step E6a: calculation of the fuel pressure based on the nominal pressure, the nominal absorbance, and the first and the second absorbance value.

The method for measuring the pressure according to an aspect of the invention, in a second embodiment, comprises the following steps:

Step E3b: measurement and storage in memory of a nominal absorbance determined based on absorbance measurements made at a first wavelength, at a second wavelength and at a third wavelength, preset and distinct from one another and at a nominal pressure, Step E5b: measurement of at least a first absorbance value, a second absorbance value and a third absorbance value, at the first wavelength, at the second wavelength and at the third wavelength, preset and distinct from one another, respectfully, Step E6b: calculation of the fuel pressure based on the nominal pressure, the nominal absorbance, the first absorbance value, the second absorbance value and the third absorbance value.

Preferably, the method further comprises the following steps before the step E3a or E3b:

Step E0: prior storage of the nominal pressure ($P_n$),

Step E1: verification of system pressurization,

Step E2: verification that a first preset time ($\Delta t1$) has elapsed, otherwise return to step 1.

and the first preset time corresponds to an average stabilization period of the fuel pressure.

The method for measuring the pressure may also comprise the step E3a or E3b, respectively, and the step E5a or E5b, respectively, the following step:

Step E4: verification that a first preset time has elapsed, otherwise return to step E1.

Suitably, the first wavelength is such that it is not absorbed by the fuel, and the second wavelength corresponds to the absorption wavelength of methane.

And the third wavelength is such that it is distinct from the first wavelength and that it is not absorbed by the fuel.

An aspect of the invention also relates to a device for measuring pressure variations of a compressed gaseous fuel in a feed system of an engine equipping a motor vehicle, said device being noteworthy in that it comprises:

a quality infrared sensor measuring at least at a first wavelength and at a second wavelength, preset and distinct from one another; a first and a second absorbance value, means for detecting pressurization of the system, a clock, means for adjusting the wavelength of the quality sensor at at least two preset and distinct wavelengths, storage means:
of a nominal absorbance, calculated based on absorbance measurements made at at least two preset wavelengths at a corresponding nominal pressure, and
of the nominal pressure, means for receiving, from the quality sensor, absorbance measurements made at at least two preset wavelengths, means for computing the pressure of the compressed gas based on the nominal absorbance, the nominal pressure and absorbance values measured at at least two preset wavelengths.

Preferably, the detection means, the clock, the adjustment means, the storage means, the receiving means, and the calculation means are included in an electronic control unit.

An aspect of the invention also relates to any gaseous fuel feed system, comprising a pressure measuring device according to any one of the characteristics listed above.

And finally, an aspect of the invention applies to any motor vehicle comprising a pressure measuring device according to any one of the characteristics listed above.

BRIEF DESCRIPTION OF THE DRAWINGS

Other aspects, characteristics and advantages of the invention will become more apparent from the following description, given as a non-limiting example and with reference to the accompanying drawings, wherein FIG. 1 schematically represents a compressed gas feed system S, intended to be carried on board a motor vehicle according to the prior art, FIG. 2, schematically represents a compressed gas feed system S', intended to be carried on board a motor vehicle according to an aspect of the invention, FIG. 3, schematically represents the electronic control unit 700 according to an aspect of the invention.

DETAILED DESCRIPTION OF THE PREFERRED EMBODIMENTS

Figure 1:
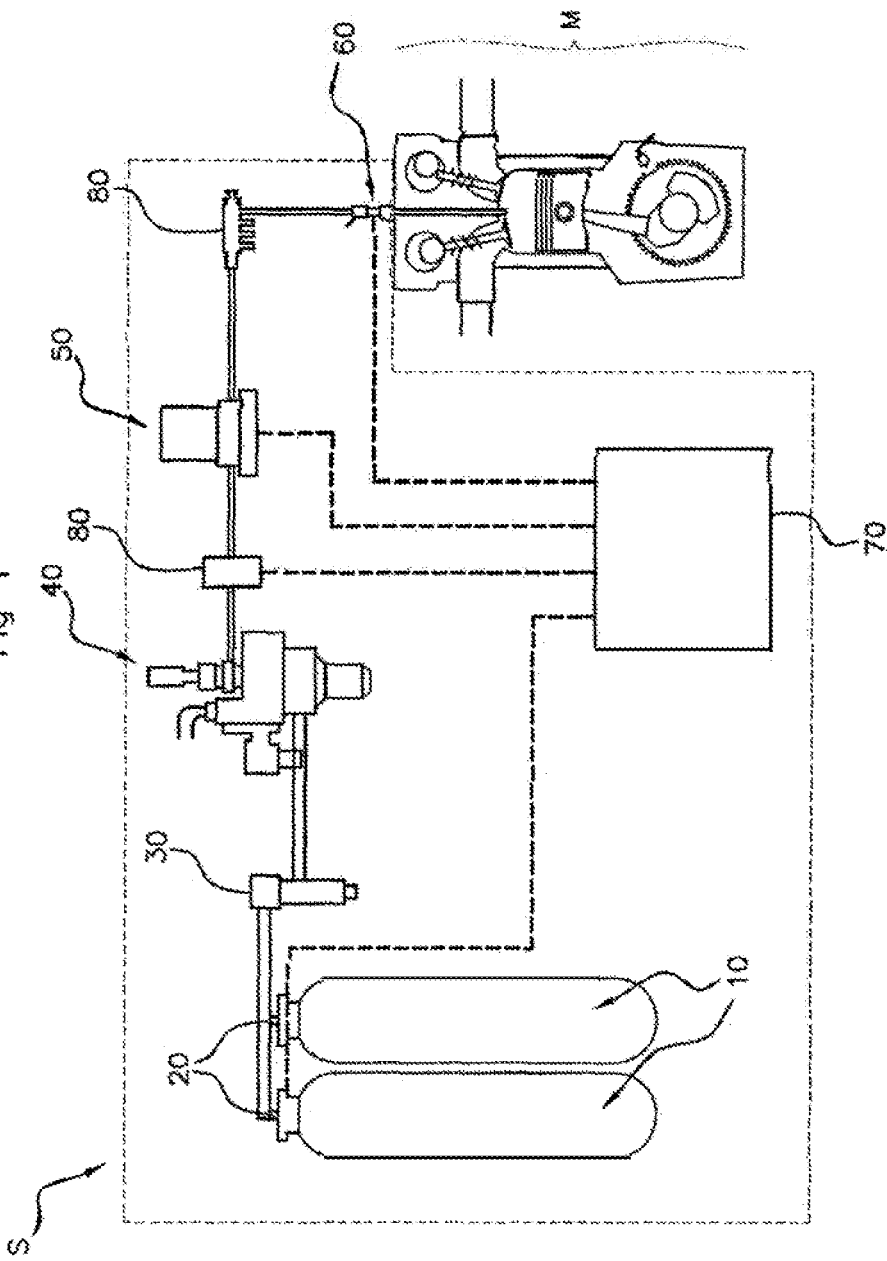
Figure 2:
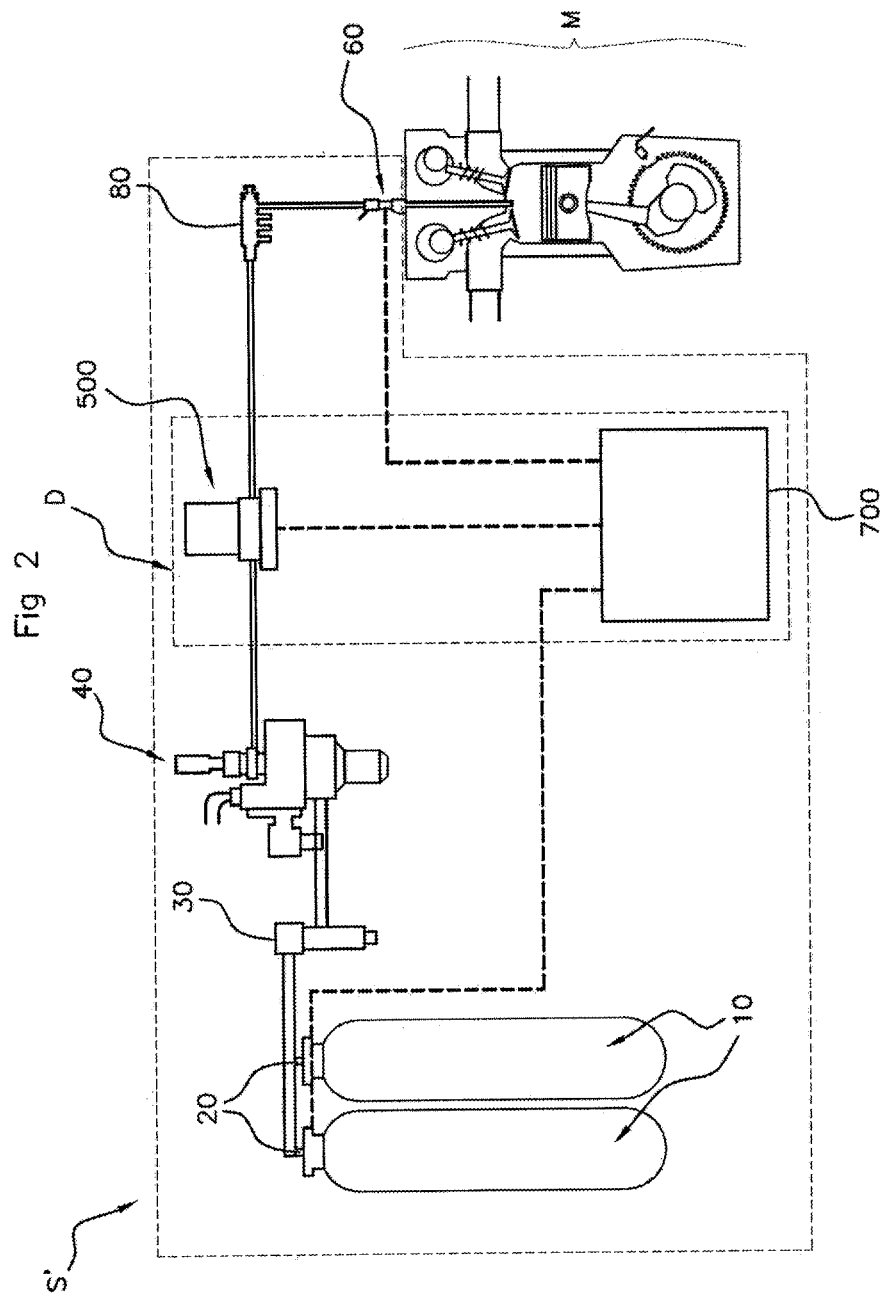
Figure 3:
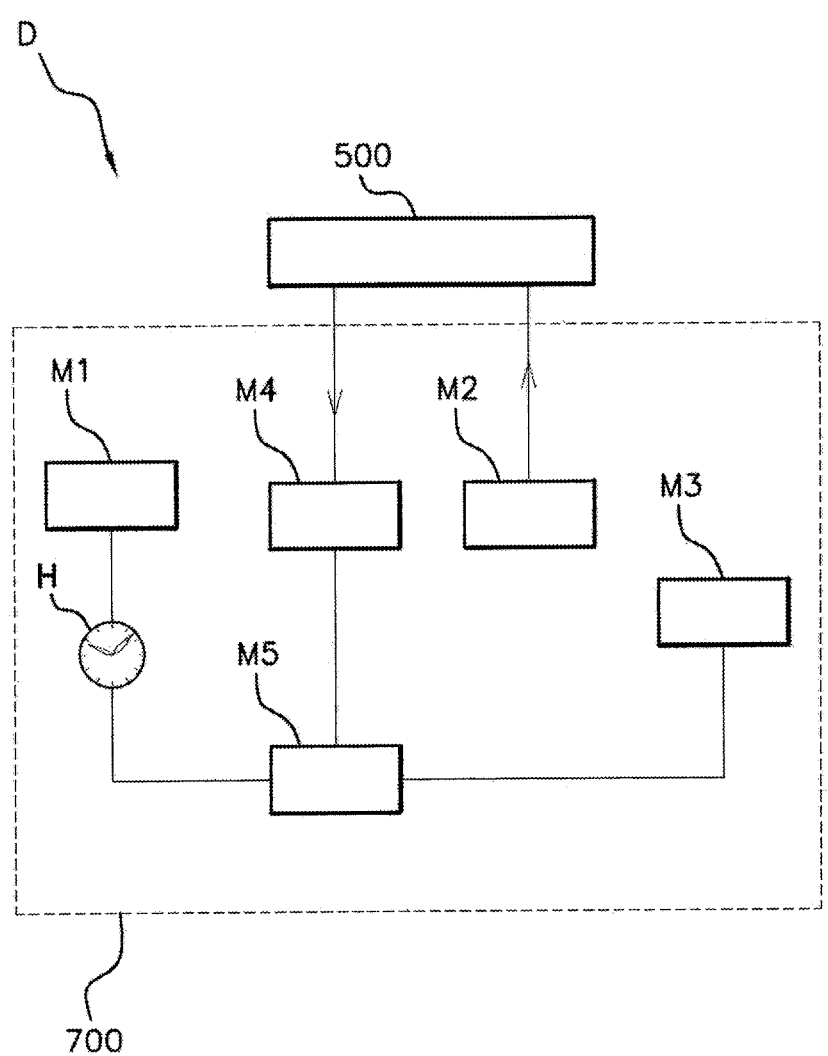

The compressed gas feed system S' of a motor vehicle, according to an aspect of the invention, is represented in FIG. 2.

As in the prior art, the feed system S' comprises a tank of natural gas 10 compressed to a pressure of approximately 250 bar, in the form of two cylinders, each equipped with a valve 20. Opening the valves 20 allows the compressed gas to circulate toward a filter 30; then toward a pressure regulator 40, more precisely a pressure-reducing valve 40, which expands the compressed gas from an initial pressure of 250 bar to an inlet pressure of less than 20 bar. The expanded compressed gas is then analyzed by a quality sensor 500. The quality sensor 500 is of the spectrometer type, i.e. infrared analysis.

The operation of the valves 20, the quality sensor 500 and the injector 60 is controlled by the on-board electronic control unit 700. The electronic control unit 700 manages the actuation of the valves 20 and of the injector 60, and receives the fuel analysis information from the pressure measurement sensor 80 and the quality sensor 50.

However, unlike the feed system S of the prior art, the feed system S' according to an aspect of the invention does not comprise a pressure measurement sensor.

According to an aspect of the invention, the quality sensor 500 and the electronic control unit 700, to which it is connected define a pressure measuring device D, and are adapted so as to be able to determine both the composition and the pressure of the compressed gas flowing toward the engine M.

The fuel, the pressure and composition of which were thus determined, is then injected into the engine M via at least one injector 60 connected to an injection ramp 80.

The pressure measuring device D comprising the fuel quality sensor 500 and the electronic control unit 700 makes it possible to do away with the need to use an additional pressure sensor.

For this purpose, the quality sensor 500 is a sensor of infrared type, measuring the absorbance of the fuel successively at at least two preset and distinct wavelengths. The quality sensor 500 makes it possible to measure the absorbance at selectable wavelengths among a window of infrared or near-infrared wavelengths. For example, the wavelength window of the quality sensor 500 is located in the absorption bands of the molecular bonds of hydrocarbons, between 800 nm and 2500 nm, preferably between 1550 nm and 1950 nm.

The electronic control unit 700 supplies the quality sensor 500 with power, controls said sensor, and receives the absorbance measurements that said sensor 500 makes.

According to an aspect of the invention, the electronic control unit 700 comprises:
- means for detecting M1 pressurization of the system S', a clock H,
- means for adjusting M2 the wavelength of the quality sensor 500 at at least two preset and distinct wavelengths, $\lambda 1$, $\lambda 2$,
- storage means M3 of a nominal absorbance $Abs_n$, calculated based on absorbance measurements $Abs_{n1}$, $Abs_{n2}$, made at at least two preset wavelengths, at a corresponding nominal pressure $P_n$, and the nominal pressure $P_n$,
- means for receiving M4, from the quality sensor 500, absorbance measurements made at at least two preset wavelengths,
- means for computing M5 the pressure $P_r$ of the compressed gas based on the nominal absorbance $Abs_n$, of the nominal pressure $P_n$, the first absorbance $Abs_1$ and the second absorbance $Abs_2$.

The means for detecting M1 pressurization of the system S' are, for example, made up of means for detecting the opening of valves 20, for example an electronic circuit measuring the control voltage over the terminals of valves 20 and supplying, as an output for example, a binary signal, 0 if the valves are closed (no control voltage, or control voltage below a threshold), 1 if the valves are open (control voltage above the threshold), which means that the compressed gas is released from the tanks 10 and circulates in the feed system S'.

The means for detecting M1 thus make it possible to know if compressed gas circulates in the feed system S'. The means for detecting M1 are connected to the clock H.

The clock H is of the electronic type, said clock H measures a duration between the opening of valves 20, detected by the means of detection M1, up to a first preset time $\Delta t1$. Once the first preset time has elapsed, the clock H sends a signal to the computing means M5. The first set time $\Delta t1$ corresponds to a time required for the compressed gas, after the valves 20 open, so that the pressure and the composition of said gas, downstream from the regulator 40 in the supply line, can stabilize.

The gas pressure fluctuates when the valves 20 open.

The gas compressed during this transitory phase, and as long as the first preset time $\Delta t1$ has not elapsed, therefore has a variable pressure. It is necessary to wait until the pressure of said gas stabilizes before starting the absorbance measurements.

Figure 5:
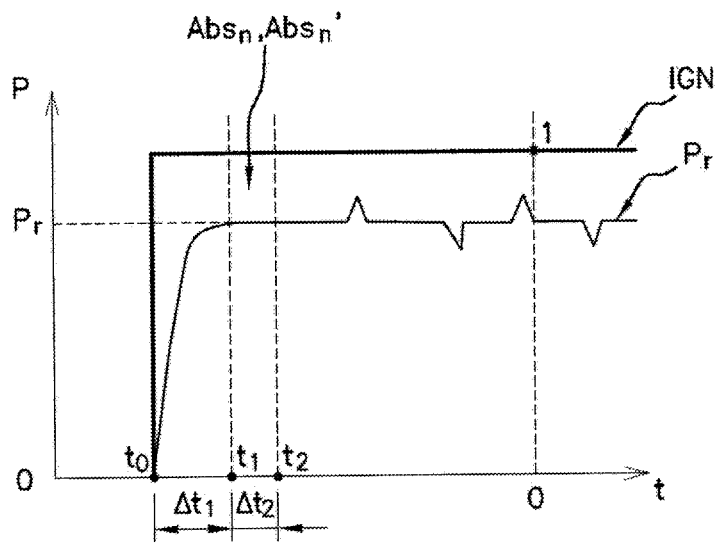

This is illustrated in FIG. 5. When the engine is running ("IGN" in FIG. 5 passes from 0 to 1), the pressure P downstream from the regulator 40 progressively increases until it reaches a stable value Pr. During the first preset time $\Delta t1$, the pressure P increases and is unstable.

The adjustment means M2 constitute the control circuit of the quality sensor 500. They allow the value of the wavelength of the transmitter of the sensor 500 to be set to a preset value.

In a first embodiment, the adjustment means M2 adjust the light beam transmitter of the quality sensor 500 to two preset and distinct wavelengths, a first wavelength $\lambda 1$, which is a so-called "reference" wavelength, and a so-called second "measurement" wavelength $\lambda 2$.

The first wavelength $\lambda 1$ is chosen in such a way that the first absorbance measurement $Abs_1$, taken at said first wavelength $\lambda 1$, is located in an area of the spectrum where the compressed gas absorbs little or not at all and therefore where the absorbance measurement varies little or not at all based on the concentration of the gas and thus its pressure.

Figure 6:
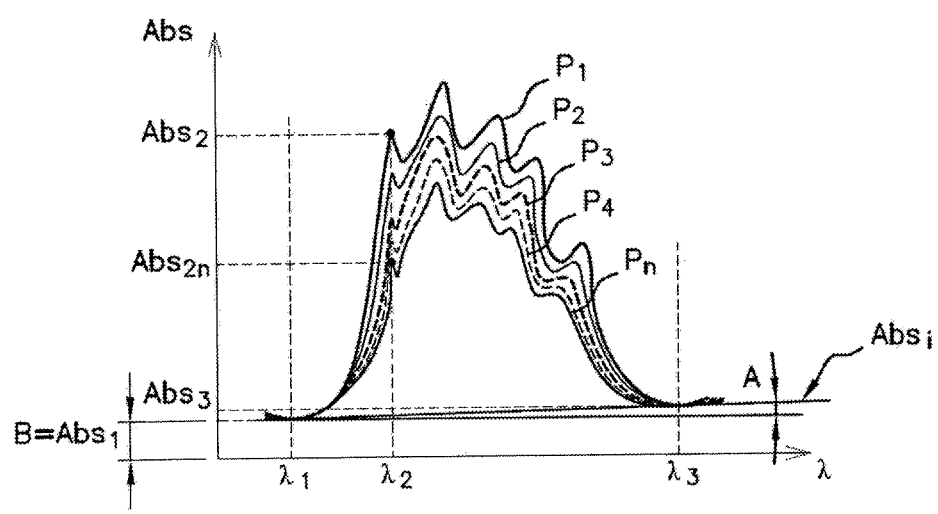
FIG. 6 represents the variation in absorbance according to the pressure of the gas at three distinct wavelengths.

This is represented in FIG. 6. For example $\lambda 1=1576.6$ nm.

The second wavelength $\lambda 2$ is chosen in such a way that the second absorbance measurement $Abs_2$ taken at said second wavelength varies greatly according to the pressure of the compressed gas. As the compressed gas is composed of more than 80% methane, and regardless of the type of compressed natural gas, the latter always contains methane, the second wavelength $\lambda 2$ thus corresponds to the detection wavelength of the methane.

This is represented in FIG. 6. For example $\lambda=1646$ nm.

A second corrected absorbance measurement $Abs_{2corr}$ can be calculated, using the following formula:

$$Abs_{2corr}=Abs_2-Abs_1$$

With:

$Abs_{2corr}$: absorbance corrected according to the first embodiment, $Abs_1$: first absorbance measurement at the first wavelength $\lambda 1$, $Abs_2$: second absorbance measurement at the second wavelength $\lambda 2$, In a second embodiment, the adjustment means M2 adjusts the light beam transmitter of the quality sensor 500 to three preset and distinct wavelengths, the first wavelength $\lambda 1$, the second wavelength $\lambda 2$, and a third wavelength $\lambda 3$, also referred to as the "reference" wavelength.

The third wavelength $\lambda 3$ is distinct from the first wavelength $\lambda 1$ and is chosen in such a way that the third absorbance measurement $Abs_3$ taken at said third wavelength $\lambda 3$ is also located in a spectral zone where the compressed gas does not absorb and therefore where the absorbance measurement varies little or not at all depending on the pressure of the compressed gas. The third absorbance measurement $Abs_3$ is like the first absorbance measurement $Abs_1$, a reference measurement, which makes it possible to measure the absorbance threshold outside any absorption of the compressed gas.

This is represented in FIG. 6. For example $\lambda 3=1923.3$ nm.

The third absorbance measurement $Abs_3$ taken at the third wavelength $\lambda 3$ makes it possible to correct any measurement deviation with the first absorbance measurement $Abs_1$ taken at the first wavelength $\lambda 1$ and improves the accuracy of the second absorbance measurement $Abs_2$ taken at the second wavelength $\lambda 2$. The third absorbance measurement $Abs_3$ makes it possible to correct any deviation in the reference absorbance measurement. The interest in this third measurement is to correct the variation in the refractive index of the compressed gas as a function of the pressure and the wavelength.

By performing a linear regression between the first absorbance measurement $Abs_1$ and the third absorbance measurement $Abs_3$, we obtain the slope A and the ordinate at the origin B (see FIG. 6) in the following manner:

$$A = \frac{(Abs_3 - Abs_1)}{(\lambda 3 - \lambda 1)}$$

And:

$$B=Abs_1$$

A being the slope, and B being the ordinate at the origin of the straight line passing through $Abs_1$ and $Abs_3$:

$$Abs_i = A \times \lambda i + B$$

Thus, the second corrected absorbance measure $Abs_{2corr}$ can be calculated in the following manner:

$$Abs_{2corr} = Abs_2 - (A \times (\lambda 2 - \lambda 1)) - Abs_1$$

With:

$Abs_{2corr}$: absorbance corrected according to the second embodiment, $Abs_1$: first absorbance measurement at the first wavelength $\lambda 1$, $Abs_2$: second absorbance measurement at the second wavelength $\lambda 2$, $Abs_3$: third absorbance measurement at the third wavelength $\lambda 3$, $\lambda 1$: first wavelength, $\lambda 2$: second wavelength, $\lambda 3$: third wavelength.

The storage means M3 is of the rewritable memory type and contain the nominal value of the absorbance $Abs_n$ of the compressed gas calculated based on absorbance measurements taken at at least two preset wavelengths $\lambda 1$, $\lambda 2$ and at a nominal pressure $P_n$ as well as the value of the nominal pressure $P_n$. The corrected value of the nominal absorbance $Abs_n$ is calculated in the following manner and determined each time the vehicle is started, when the pressure of the compressed gas is stabilized, once the first preset time $\Delta t1$ has elapsed, according to the following formula:

$$Abs_n = Abs_{n2} - Abs_{n1}$$

With:

$Abs_n$: value of the nominal absorbance according to the first embodiment, $Abs_{n1}$: value of the absorbance measured at the nominal pressure $P_n$ and at the first wavelength $\lambda 1$, $Abs_{n2}$: value of the absorbance measured at the nominal pressure $P_n$ and at the second wavelength $\lambda 2$, The nominal pressure $P_n$ is assumed to have a fixed value and corresponds to the pressure of the pressure regulator 40, for example 8 bar. The nominal pressure $P_n$ is stored in the storage means M3.

Similarly, according to the second embodiment, the value of the nominal absorbance $Abs_{n'}$ is calculated based on absorbance measurements taken at the three preset wavelengths $\lambda 1$, $\lambda 2$, $\lambda 3$ at the nominal pressure $P_n$, according to the following formula:

$$Abs_{n'} = Abs_{n2} - (A' \times (\lambda 2 - \lambda 1)) - Abs_{n1}$$

With:

$$A' = \frac{(Abs_{n3} - Abs_{n1})}{(\lambda 3 - \lambda 1)}$$

And:

$$B' = Abs_{n1}$$

$Abs_{n'}$: value of the nominal absorbance according to the second embodiment, $Abs_{n1}$: value of the absorbance measured at the nominal pressure $P_n$ and at the first wavelength $\lambda 1$, $Abs_{n2}$: value of the absorbance measured at the nominal pressure $P_n$ and at the second wavelength $\lambda 2$, $Abs_{n3}$: value of the absorbance measured at the nominal pressure $P_n$ and at the third wavelength $\lambda 3$, $\lambda 1$: first wavelength, $\lambda 2$: second wavelength, $\lambda 3$: third wavelength.

The storage means M3 are connected to the computing means M5.

The receiving means M4, for example an electronic circuit for receiving data, receives all the absorbance measurements that are sent by a "Controller Area Network" (CAN) bus, for example, or by any other type of communication protocol known to those skilled in the art, by the quality sensor 500 at at least two preset wavelengths, i.e.: the first absorbance $Abs_1$ at the first wavelength $\lambda 1$, the second absorbance $Abs_2$ at the second wavelength $\lambda 2$, and in the second embodiment, the receiving means M4 also receive the third absorbance $Abs_3$ carried out at the third wavelength $\lambda 3$, as well as all the nominal absorbance values $Abs_{n1}$: value of the absorbance measured at the nominal pressure $P_n$ and at the first wavelength $\lambda 1$, and $Abs_{n2}$: value of the absorbance measured at the nominal pressure $P_n$ and at the second wavelength $\lambda 2$, and $Abs_{n3}$: value of the absorbance measured at the nominal pressure $P_n$ and at the third wavelength $\lambda 3$.

The receiving means M4 are connected to the computing means M5.

The computing means M5 are in the form of software.

In the first embodiment, the computing means M5 determines the actual pressure $P_r$ of the compressed gas flowing downstream from the regulator 40, as a function of the nominal absorbance $Abs_n$, the nominal pressure $P_n$ and the absorbance corrected as a function of the first absorbance $Abs_1$ and the second $Abs_2$ absorbance, measured by the quality sensor 500, by the following formula:

$$P_r = P_n \times \frac{Abs_{2corr}}{Abs_n}$$

$Abs_n$: value of the nominal absorbance at the nominal pressure Pn, according to the first embodiment, $Abs_{2corr}$: value of the absorbance corrected according to the first embodiment, $P_n$: nominal pressure of the pressure regulator 40; 8 bar, for example, $P_r$: actual pressure flowing downstream from the regulator 40 that we want to determine, according to the first embodiment, In the second embodiment, the computing means M5 determines the actual pressure $P_{r'}$ of the compressed gas from the corrected absorbance $Abs_{2corr'}$ measurement and from the nominal absorbance $Abs_{n'}$ measurement which were each determined from the three absorbance measurements.

i.e.:

$$P_r' = P_n \times \frac{Abs_{2corr}'}{Abs_n'}$$

with:

$Abs_{n'}$ nominal absorbance value, according to the second embodiment, $Abs_{2corr'}$: absorbance value corrected according to the second embodiment, $P_{r'}$: actual pressure flowing downstream from the regulator 40 that we want to determine, according to the second embodiment, $P_n$: nominal pressure of the pressure-reducing valve 40; 8 bar, for example.

Figure 4:
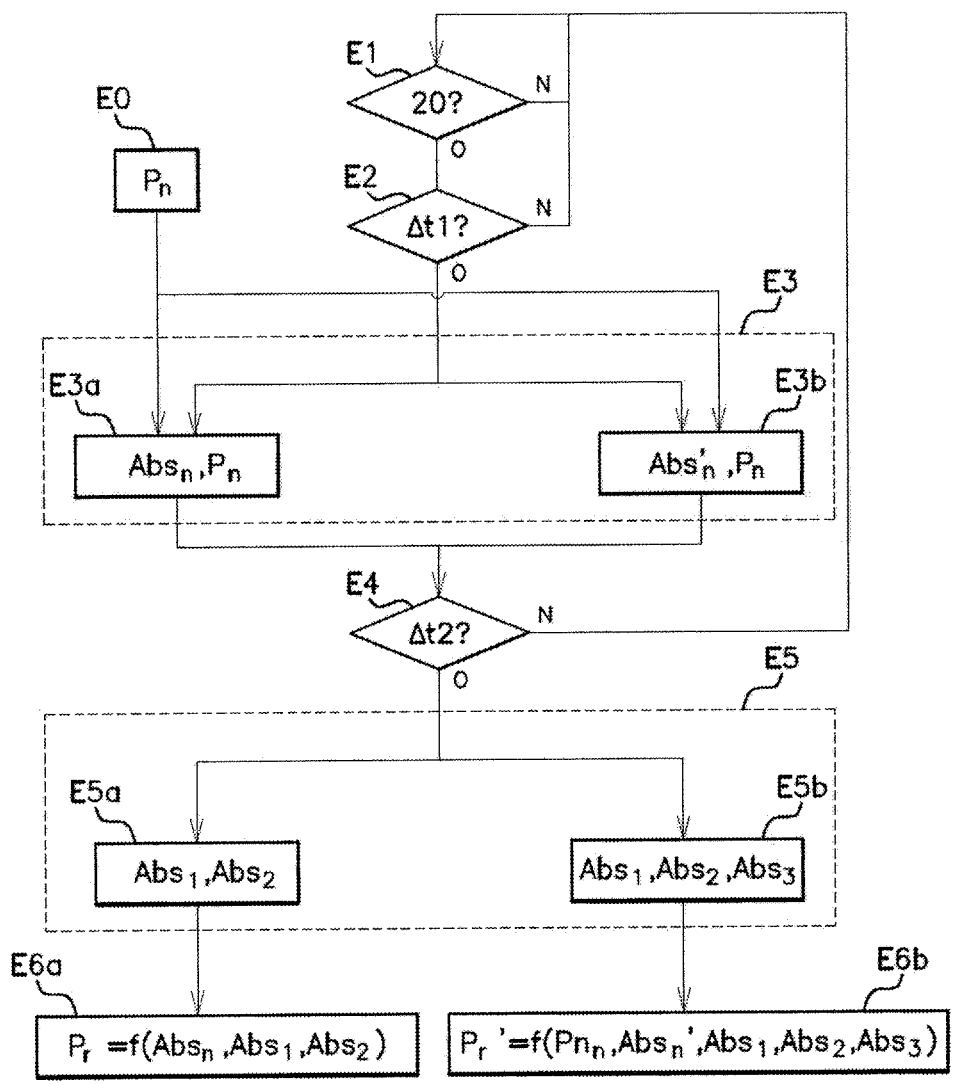
FIG. 4 is a flow chart representing the method for measuring the pressure according to an aspect of the invention, FIG. 5 schematically represents the pressure downstream from the pressure regulator from the moment the vehicle is supplied with power.

The pressure method $P_r$, $P_{r'}$ of the gaseous fuel circulating in the feed line S' of the engine M and illustrated in FIG. 4 will now be described.

In a first preliminary step (E0), the nominal pressure $P_n$, either the outlet pressure of the regulator 40, or the pressure downstream of the regulator 40 when it is operating, is recorded in the storage means M3 so as to be used to determine the actual pressure $P_r$, $P_{r'}$ as described below.

During a first step (E1), if the opening of the valves 20 was been detected by the detection means M1, i.e. if the vehicle is energized and the engine has started, then during the preset time Δt1 (step E2), no absorbance measurement is performed.

Then, once the first preset time elapses Δt1, in a third step (E3), the adjustment means M2 control the quality sensor 500 so that it measures the nominal absorbance value, determined from two (step E3a) or three absorbance measurements (step E3b) which are assumed to be carried out at the nominal pressure $P_n$, which is the pressure of the regulator 40, previously stored in memory, i.e. $Abs_n$ or $Abs_{n'}$. Said measurements are stored in memory in the storage means M3.

In a fourth step (E4), no absorbance measurement is taken as long as a second preset time Δt2, measured by the clock H, has not elapsed. Once the second preset time Δt2, has elapsed, then the measurement is taken:

Step E5a: the first and second absorbance values $Abs_1$, $Abs_2$ in the first embodiment at the first and second wavelength λ1, and λ2 or Step E5b: the first, second and third absorbance value $Abs_1$, $Abs_2$, $Abs_3$ at the first, second and third wavelength λ1, λ2, and λ3.

The quality sensor 500 then sends said measurements to the receiving means M4, and the computing means M5 then calculate the actual pressure $P_r$, $P_{r'}$ circulating downstream from the regulator by the formula, for the first embodiment (step E6a):

$$P_r = P_n \times \frac{Abs_{2corr}}{Abs_n}$$

With:

$$Abs_{2corr} = Abs_2 - Abs_1$$

And:

$P_n$: nominal pressure of the regulator 40, determined beforehand and stored in the storage means M3.

$Abs_n$: nominal absorbance according to the first embodiment, $Abs_{2corr}$: absorbance corrected according to the first embodiment, $Abs_1$: first absorbance measurement at the first wavelength λ1, $Abs_2$: second absorbance measurement at the second wavelength λ2, And by using the following formula for the second embodiment (step E6b):

$$P_r' = P_n \times \frac{Abs'_{2corr}}{Abs'_n}$$

With:

$$Abs_{2corr'} = Abs_2 - (A \times (\lambda 2 - \lambda 1)) - Abs_1$$

And:

$$A' = \frac{(Abs_{n3} - Abs_{n1})}{(\lambda 3 - \lambda 1)}$$

$P_n$: nominal pressure, $Abs_n$: nominal absorbance according to the second embodiment, $Abs_{2corr'}$: absorbance corrected according to the second embodiment, $Abs_1$: first absorbance measurement at the first wavelength λ1, $Abs_2$: second absorbance measurement at the second wavelength λ2, $Abs_3$: third absorbance measurement at the third wavelength λ3, λ1: first wavelength, λ2: second wavelength, λ3: third wavelength.

The method for measuring pressure according to an aspect of the invention judiciously makes it possible to use the fuel quality sensor to determine the fuel pressure.

The method of an aspect of the invention judiciously uses the variation of the fuel absorbance value as a function of the fuel pressure at certain wavelengths to determine the fuel pressure in the feed system simply from absorbance measurements.

An aspect of the invention is based on the assumption that the pressure downstream from the regulator, once the pressurized and stabilized system, is considered as the nominal pressure of the regulator. Any pressure variation in the system is then estimated as a function of this nominal pressure $P_n$.

The measurement method also proposes to perform various absorbance measurements in order to correct the values measured and to achieve better accuracy of the fuel pressure.

Finally, the pressure measuring device is ingenious and inexpensive as it requires only simple software and hardware means built into the electronic control unit of the sensor and makes it possible to do away with the need for an additional dedicated pressure sensor.

The invention claimed is:

1. A method for measuring pressure of a gaseous fuel compressed in a feed system of an engine equipping a motor vehicle, by a pressure measuring device comprising an infrared quality sensor and an electronic control unit, the measuring method comprising:
    determining a composition of the fuel using absorbance measurements made with the infrared quality sensor;
    determining a nominal absorbance value from absorbance measurements performed at a nominal pressure, at a first time after the motor vehicle is started and after a phase of stabilization of the fuel pressure, and at preset wavelengths using the infrared quality sensor;
    determining a corrected absorbance value of the fuel based on absorbance measurements performed at a second time after the first time, by infrared analysis at the preset wavelengths using the infrared quality sensor; and
    determining the pressure of the fuel based on the nominal pressure, the corrected absorbance value, and the nominal absorbance value.

2. The method for measuring pressure according to claim 1 further comprising:

Step E3a: measurement and storage of the nominal absorbance value determined based on absorbance measurements made at a first wavelength and at a second wavelength, preset and distinct from one another at a nominal pressure, Step E5a: measurement of at least a first, and a second absorbance value at the first wavelength and at the second wavelength, present and distinct from one another;

Step E6a: calculation of the fuel pressure as a function of the nominal pressure, of the nominal absorbance value, of the first and of the second absorbance value.

3. The method for measuring pressure according to claim 1, wherein
the preset wavelengths comprise a first wavelength $\lambda 1$, second wavelength $\lambda 2$, and a third wavelength $\lambda 3$, preset and distinct from one another.

4. The method for measuring pressure as claimed in claim 2 further comprising, before step E3a, performance of the following steps:

Step E0: prior storage in memory of the nominal pressure,

Step E1: verification of system pressurization, and

Step E2: verification that a first preset time has elapsed, otherwise return to step E1, and, the first preset time corresponds to an average stabilization time of the fuel pressure.

5. The method for measuring pressure as claimed in claim 4 further comprising, between the step E3a, and the step E5a, the following step:

Step E4: verification that a second preset time has elapsed, otherwise return to the step E1.

6. The method as claimed in claim 2, wherein, the first wavelength is such that it is not absorbed by the fuel, and the second wavelength corresponds to the absorption wavelength of methane.

7. The method for measuring pressure as claimed in claim 3, wherein the third wavelength $\lambda 3$ is such that it is distinct from the first wavelength $\lambda 1$ and that is not absorbed by the fuel.

8. The method for measuring pressure as claimed in claim 3 further comprising performance of the following steps:

Step E0: prior storage in memory of the nominal pressure,

Step E1: verification of system pressurization, and

Step E2: verification that a first preset time has elapsed, otherwise return to step E1.

9. The method for measuring pressure as claimed in claim 8 further comprising the following step:

Step E4: verification that a second preset time has elapsed, otherwise return to the step E1.

10. The method for measuring pressure according to claim 1, wherein the pressure of the fuel is determined using the following equation:

$$P_r = P_n \times \frac{Abs_{2corr}}{Abs_n}$$

wherein $Abs_n$ is the nominal absorbance value, $Abs_{2corr}$ is the corrected absorbance value, $P_n$ is the nominal pressure, and $P_r$ is the pressure of the fuel.

11. The method for measuring pressure according to claim 3, wherein
the first wavelength $\lambda 1$ and the third wavelength $\lambda 3$ are located in a spectral zone where the fuel has low or no absorption and the second wavelength $\lambda 2$ is located in a spectral zone where the fuel has high absorption.

12. The method for measuring pressure according to claim 3, wherein
an absorption of the fuel at the third wavelength $\lambda 3$ is used to correct variation in a refractive index of the fuel as a function of pressure and wavelength by calculating a value of a coefficient A, wherein $A=(Abss3-AbsS1)/(\lambda 3-\lambda 1)$.

13. A device for measuring pressure variations of a gaseous fuel compressed in a feed system of an engine equipping a motor vehicle, the device comprising:
a quality infrared sensor measuring at least at a first wavelength and at second wavelength, preset and distinct from one another; a first and a second absorbance value,
means for detecting pressurization of the system,
a clock,
means for adjusting the wavelength of the quality sensor,
means for storing in memory
a nominal absorbance value, calculated based on absorbance measurements performed at a nominal pressure and taken at a first time after the motor vehicle is started and after a phase of stabilization of the fuel pressure at at least two preset wavelengths using the infrared sensor, and
the nominal pressure,
means for receiving, from the quality sensor, absorbance measurements made at a second time after the first time at the at least two preset wavelengths,
means for determining a composition of the fuel using absorbance measurements made with the infrared quality sensor and computing the pressure of the compressed gas as a function of the nominal absorbance value measured at the first time, the nominal pressure, and corrected absorbance values determined based on the absorbance measurements made at the second time at the at least two preset wavelengths.

14. The device according to claim 13, wherein the detection means, the clock, the adjustment means, the storage means, the receiving means, and the computing means are included in an electronic control unit.

15. A feed system for gaseous fuel, comprising a pressure measuring device as claimed claim 13.

16. A motor vehicle comprising a pressure measuring device as claimed in claim 13.

17. The device according to claim 13, wherein the at least two preset wavelengths comprise a first wavelength $\lambda 1$, a second wavelength $\lambda 2$, and a third wavelength $\lambda 3$, preset and distinct from one another, and
the first wavelength $\lambda 1$ and the third wavelength $\lambda 3$ are located in a spectral zone where the fuel has low or no absorption and the second wavelength $\lambda 2$ is located in a spectral zone where the fuel has high absorption.

18. The device according to claim 13, wherein the at least two preset wavelengths comprise a first wavelength $\lambda 1$, a second wavelength $\lambda 2$, and a third wavelength $\lambda 3$, preset and distinct from one another, and
an absorption of the fuel at the third wavelength $\lambda 3$ is used to correct variation in a refractive index of the fuel as a function of pressure and wavelength by calculating a value of a coefficient A, wherein $A=(Abss3-AbsS1)/(\lambda 3-\lambda 1)$.

* * * * *